June 21, 1966  E. L. BENNO  3,256,864
LIVESTOCK FEEDER

Filed Feb. 10, 1964  4 Sheets-Sheet 2

INVENTOR.
Edward L. Benno
BY
Kenneth D. Snow
Atty.

June 21, 1966   E. L. BENNO   3,256,864
LIVESTOCK FEEDER

Filed Feb. 10, 1964   4 Sheets-Sheet 4

INVENTOR.
Edward L. Benno
BY
Kenneth T. Snow
Atty.

United States Patent Office 3,256,864
Patented June 21, 1966

3,256,864
LIVESTOCK FEEDER
Edward L. Benno, Skokie, Ill., assignor of one-half to
Kenneth T. Snow, Chicago, Ill.
Filed Feb. 10, 1964, Ser. No. 343,607
15 Claims. (Cl. 119—56)

This invention relates generally to livestock feeders, and more particularly to a novel piston type conveyor and dump tube feeder.

The primary object of the present invention is to provide a novel livestock feeder construction for the efficient feeding of large numbers of livestock.

It is a further object to provide a novel livestock feeder construction which is susceptible to automatic operation or control by a computer.

It is a further object to provide a novel livestock feeder construction in which a unit charge of feed may be exactly placed in a certain selected position for dumping and then dumped in that position.

It is a further object to provide a novel livestock feeder construction in which the feed may be dumped in selected patterns of unit feed charges which are different both in amount and feed constituents, and in which each such unit charge of feed may be dumped in selected areas along the length of the feeder and independently of where every other charge of feed may be dumped.

It is a further object to provide a novel livestock feeder construction having a dump tube and a certain conveyor for the dump tube in which the construction inherently provides for a minimum of tube wear.

It is still another object to provide a novel livestock feeder construction in which maintenance and repair of the feed conveyor is a relatively simple and easy task.

It is still another object to provide a novel livestock feeder construction in which the possibility of damage to cattle such as torn tongues or cut horns is substantially non-existent.

It is still another object to provide a novel livestock feeder construction which can handle an extremely wide variety of feed such as corn, grain, potatoes, beets, silage, haylage, or packaged feeds or supplements, and which can even deliver and dump an open container of liquid in an exactly selected position along the length of the feeder.

A unique feature of the invention is the certain construction of a rotatable dump tube and a piston type conveyor for the dump tube which has many advantages over constructions comprising a dump tube and an auger conveyor.

It is believed that one of the many advantages of the subject invention is the substantially greater dump tube length that is permitted in comparison to the lengths which may be used with an auger conveyor. It is well known that in substantial dump tube lengths, the friction created by an auger conveyor is such as to literally twist and tear the tube apart.

Another advantage of the subject invention is that the total power requirements thereof may be considerably less than necessary for current commercial auger type feeders.

Other objects and features of the invention will be apparent upon a perusal of the following specification and drawings in which.

The present embodiment is the preferred embodiment, but it is to be understood that changes can be made in the present embodiment by one skilled in the art without departing from the spirit and scope of the present invention.

Figure 11:
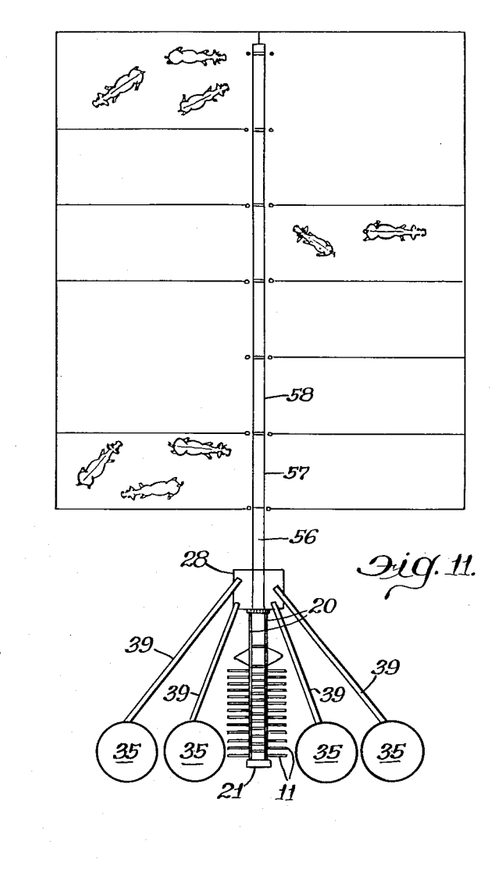
FIGURE 11 is a diagrammatic view of a livestock feeding system utilizing the subject invention.

Generally, the livestock feeder of the subject invention comprises a conveyor system, a feed receiving or hopper section, and a dump tube arrangement. The dump tube arrangement comprises a plurality of tube sections or members which are secured together in an end-to-end relationship to produce one long dump tube arrangement of a desired length. FIGURE 11 somewhat diagrammatically portrays the cooperation of such a dump tube arrangement with a livestock feeding area. It is contemplated that such tube arrangements may reach lengths of three hundred feet or more. Many present commercial feeders are limited in length simply because they will not operate in lengths of two hundred, three hundred, or four hundred feet. In a livestock feeding area the dump tube arrangement may traverse a great number of individual pens, yards or stockades, each having a different type, different number, or different age of livestock. Each group of animals requires a particular feeding formula and feeding schedule if it is to be raised or fattened in an economical and efficient manner. The subject invention uniquely provides a feeding arrangement for economically and efficiently feeding a large number of different groups of animals with a minimum of manual labor. The subject invention provides an arrangement whereby livestock in adjoining pens may be fed entirely different rations. The subject invention provides an arrangement whereby a selective number of pens out of a group of livestock pens may be supplied with feed while the other pens in the arrangement are not supplied with feed. The livestock feeder of the subject invention also provides for the delivering of an open container of liquid to a selected livestock pen of a group of livestock pens and the dumping of the liquid from the container into the selected pen.

Because of the ability of the livestock feeder of the subject invention to dump a selected unit charge of feed at a selected position along the length of the feeder, the subject invention is particularly well suited to automatic operation or automatic control thereof by a computer.

Generally, the joints between tube sections of the dump tube arrangement are rotatively carried on rollers which in turn are carried on a stand. Thus the entire tube arrangement is rotatively supported on a plurality of stands spaced longitudinally thereof. The stands may be placed to extend the tube arrangement through a plurality of individually fenced pens such as shown in FIGURE 11. The stands may further be placed in or over appropriate feed troughs or bunks. Further, diverter boards may be provided below the tube arrangement. After the feed is dumped into the troughs or bunks it is readily available to the livestock for consumption thereof. The individual tube sections of the tube arrangement are of a certain length cooperating with the length of the conveyor sections and the length of the feed hopper. If the length of the feed hopper is five feet, then ideally the length of each conveyor section should be five feet, and the tube sections of the tube arrangement may conveniently be of a length such as ten feet so that the stands along the tube arrangement are placed every ten feet thereof.

In the present embodiment of the invention, the individual tube sections of the tube arrangement are substantially open along one side thereof for a circumferential distance of less than one half of the circumference. Thus, the entire tube arrangement is substantially provided with a slot which extends substantially longitudinally thereof along a straight line and is discontinuous only at the stands or the joints between tube sections. If each tube section is of a length which is twice the length of a conveyor section, the longitudinal center of each tube section may be provided with a circumferentially continuous portion so that each tube section comprises two slots alinged end to end. The dump tube arrangement is charged with feed when the tube arrangement is positioned with the slot or slots disposed upwardly. Upon completing the charging, the tube arrangement is rotated to lower the slot or slots to the underside thereof so that the feed charge or charges fall or otherwise drop therefrom into an appropriate receptacle or feed bunk therebelow. In the present embodiment the tube arrangement is rotated through a bull gear which is secured about the tube arrangement at the near end thereof. Appropriate gearing from a source of power to the gearing provides for rotation of the tube arrangement.

In the present embodiment a cover arrangement is provided for the dump tube arrangement. The cover arrangement comprises a series of individual cover sections which are carried on the stands and extend over the top of each tube section. Each cover section extends circumferentially of the tube sections more than one half of the circumference of the tube sections so that a horizontal plane through the center of the tube sections includes the lower edge portions of the cover sections. Further, those longitudinal lower edge portions of the cover sections are reinforced to resist outward pressures applied by the conveyor system to the side walls of the tube sections and thereby prevent bulging or distortion of the tube arrangement.

As an alternative construction, the cover arrangement may be omitted if charges of feed will not be greater in depth than the depth of the closed portions of the tube arrangement. Without a cover arrangement, the longitudinal side walls of the tube sections may be reinforced to resist outward pressures applied by the conveyor system.

Note should be made of the desirability of having the slot opening of the tube arrangement sufficiently wide to easily discharge from the tube arrangement all anticipated types of feed. The slot width must be particularly considered if the feed is to comprise large sugar beets or solid or packaged feeds or supplements. The cross sectional size of the tube arrangement which is shown in the drawings is not intended to display an accurate size. The cross sectional size of the tube should be correlated to the type of livestock and their particular feed requirements.

The near end of the tube arrangement opens into one end of the feed hopper. The shape of the upper portion of the feed hopper of the present embodiment is merely by way of example, and it should be understood that the upper portion may be shaped in many different ways to accommodate or receive different types of feed charges. For example, the upper portion of the hopper may include or comprise liquid lines and valving, choppers, hammer mills, blowers, mixers or augers, so that the feed to be delivered to the lower portion of the hopper is effectively prepared or processed for feeding. The lower portion of the hopper comprises a trough having the same shape and being of the same size as the interior of the tube arrangement. Although not shown in the drawings, various known feed cutoff devices or valve means may be provided between the upper and lower portions of the hopper to accurately determine or stop the delivery of feed to the lower portion of the hopper. Further, as an alternative, the lower portion of the hopper may be made to rotate with the conveyor system and the tube arrangement.

The end of the hopper opposite from the end which opens into the near end of the tube arrangement is provided with an opening through which the conveyor system finds entrance to the hopper and the tube arrangement. The conveyor system comprises a plurality of plates interconnected by a plurality of folding struts. The plates must have the same shape as the cross sectional area of the tube arrangement and in the present embodiment the plates are circular in shape and have a diameter substantially equal to the inner diameter of the tube arrangement. The folding struts which interconnect adjacent plates are provided in pairs between each pair of plates with each folding strut of a pair comprising two pivotally connected strut sections. Each end of each folding strut is pivotally connected to a plate at the side marginal edge thereof to extend generally in a direction perpendicular to the plane of the plates. Each folding strut is of a length so that when the struts are disposed in a straight line, the distance between adjacent plates is substantially equal to the length of the hopper. The conveyor is so carried in the hopper and the tube arrangement that the folding struts lie in a substantially horizontal plane through the center of the tube arrangement. For accurate knowledge of the position of any one conveyor section relative to the livestock feeding area it is desirable and convenient that the length of a conveyor section or the distance between adjacent plates of the conveyor be equal to the distance between adjacent stands or some whole number multiple of the distance between adjacent stands.

The conveyor is carried in a rotatable rack which is constructed to carry the conveyor in a retracted condition in which adjacent plates are in a side-by-side horizontally stacked condition with the folding struts being completely folded and extending outwardly of the rack. In this manner the conveyor supporting rack or frame need only be relatively short in length relative to the length of the tube arrangement. For example, for a certain sized feeder it has been estimated that a conveyor rack or frame which is approximately four feet long will receive and hold a folded conveyor which can be unfolded or extended into a conveyor sufficient to reach the remote end of a tube arrangement which is a hundred feet long. The conveyor rack must also be sufficiently long to guide one pair of plates with the struts therebetween in a straight condition into the feed hopper.

When any portion or proportion of the conveyor is disposed within the conveyor rack and the tube arrangement, the conveyor rack is rotatable with the tube arrangement. This construction provides that the conveyor will be rotated with the tube arrangement between the dumping and charging positions and the conveyor never rotates relative to the tube arrangement. In the present embodiment, the contemporaneous rotation of the conveyor rack and the tube arrangement is insured by providing the near end of the conveyor rack with a bull gear similar to the bull gear carried at the near end of the tube arrangement and by mechanically interlocking the two bull gears through a jack shaft and a pair of spur gears. The remote end of the conveyor rack is supported on a pair of rollers which in turn are carried on a stand. In the present embodiment, the conveyor rack comprises four rack members, which may be described as disposed in vertical pairs which are horizontally spaced apart a distance substantially equal to the width or diameter of the conveyor plates. Each vertical pair of frame members is vertically spaced apart a distance substantially equal to the outer diameter of the struts of the conveyor. Thus it may be seen that as each conveyor section is retracted, the folding struts extend through the vertically spaced frame members and outwardly thereof.

Figure 9:
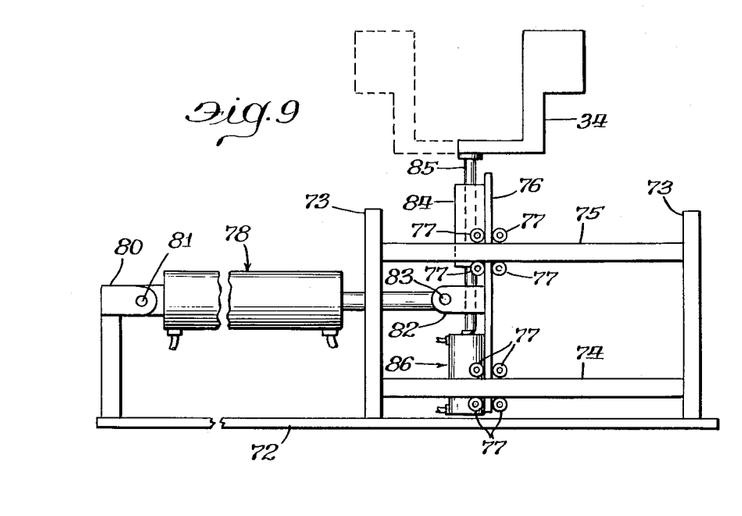
FIGURE 9 is a side elevational view of one type of operator mechanism for the conveyor of the invention.

A number of different types of operators may be used for extending and retracting the conveyor. A pneumatic operator system for the conveyor is shown in FIGURE 9. Other contemplated arrangements involve the use of cables and pulleys.

Because the conveyor folds substantially completely into the conveyor rack when not in use, the maintenance and repair of the conveyor is conveniently and efficiently accomplished. Because the conveyor does not involve an auger, damage to livestock such as torn tongues or cut horns as commonly experienced with auger type feeders is absent.

The operation of the livestock feeder of the subject invention may generally be described as beginning with the conveyor substantially completely retracted into the conveyor frame and with the first section of the conveyor disposed in the feed hopper so that the first conveyor plate closes off the tube side of the hopper and so that the second conveyor plate closes off the conveyor side of the hopper. A selected charge of feed is then delivered to the upper portion of the hopper from which it is transferred to the lower portion thereof and within the first section of the conveyor. The conveyor operator is then operated to advance or extend the conveyor. With feed supplied only to the first conveyor section or possibly the first and second conveyor sections, the conveyor may if desired, be substantially completely extended to carry the charge of feed some great distance through the tube arrangement, such as to the most remote pen shown in FIGURE 11. The power means may then be operated for rotating the tube arrangement and the conveyor rack to dump the feed charge from the tube. Selectively, the feed charge of the first tube section may be deposited or dumped at any position intermediate the ends of the tube arrangement merely by stopping the extension of the conveyor at the selected position and by then rotating the tube arrangement and the conveyor rack to dump the feed charge. No matter how long a tube arrangement is used, it is a simple matter with the subject invention to accurately determine the position of any conveyor section or sections when the length of each conveyor section is known. For example, a simple counter may count conveyor sections as they are extended and may translate the count into a distance reading or livestock pen location.

Also selectively each section of the conveyor may be supplied with a different type or formula of feed, or if desired, feed may be completely omitted from some selected ones of the intermediate conveyor sections. In the rotation of the tube arrangement and the conveyor rack for dumping of the feed charges, the rotation may occur in either direction and through use of feed diverter boards, the rotation of the tube arrangement can be correlated to the side of the tube arrangement on which it is desired to dump the feed charges. Further, the rotation of the tube arrangement in dumping need not be discontinuous, but dumping may occur by a slow rolling of the tube arrangement through an angle of 360°. Rotation of the tube in dumping may further occur by a rotation of the tube arrangement through an angle of 180°, a stopping of the tube arrangement, and a reverse rotation back through the same angle of 180°. After the feed charges have been dumped from the tube arrangement, the conveyor operator is caused to retract or withdraw the conveyor from the tube arrangement and into the compact folded condition in the conveyor rack. The feeder is then ready for the next feeding cycle.

It is believed that one unobvious advantage of the subject invention which is inherent by virtue of the construction thereof, is the ability to operate the feeder under conditions wherein only a minimum of power is available.

Most commercially available livestock feeders require three phase electrical power which is simply not available in every rural area. In the feeder of the present invention, if at any time the feed charges exert such a heavy load upon the power equipment, that the entire conveyor system may not be charged with feed, some portion of the conveyor system less than the total length may be charged with the heavy loading feed. It may be appreciated that, if necessary, merely the first section of the conveyor may be charged with feed, and that charge may be extended out to the remote end of the feeder and dumped therefrom. The conveyor may then be retracted and the first conveyor section again charged and the conveyor may then be extended out to the second pen or station from the most remote end. Progressively the cycle may be repeated with minimum power demands to effectively dump feed the entire length of the tube arrangement although the available power is insufficient to permit charging and simultaneous dumping of feed the full length or even a substantial portion of the length of the tube arrangement.

In the contemplated use of the subject feeder under the control of a computer, any well known sensing device may be applied to the feeder to constantly sense and indicate the position of each extended section of the conveyor. With the conveyor operator and the dumping means under control of the computer, the conveyor may be extended to any predetermined extent at any predetermined time, and responsive to the predetermined extension of the conveyor, the tube arrangement can be dumped and the conveyor returned from the extended position in any predetermined pattern. Thorugh the sensing of the extended position of each section of the conveyor as it reaches or enters the hopper, and by means of a predetermined programming of the computer, the computer may cause appropriate feed valves or delivery systems to be operated at predetermined times and to predetermined extents to supply each conveyor section in the hopper with a predetermined formula or quantity of feed and may cause the conveyor to deliver each predetermined formula for quantity of feed to an exact predetermined station along the tube arrangement at predetermined times for compeltely computer controlled feeding of a large number of groups of different livestock.

Figures 6, 7:
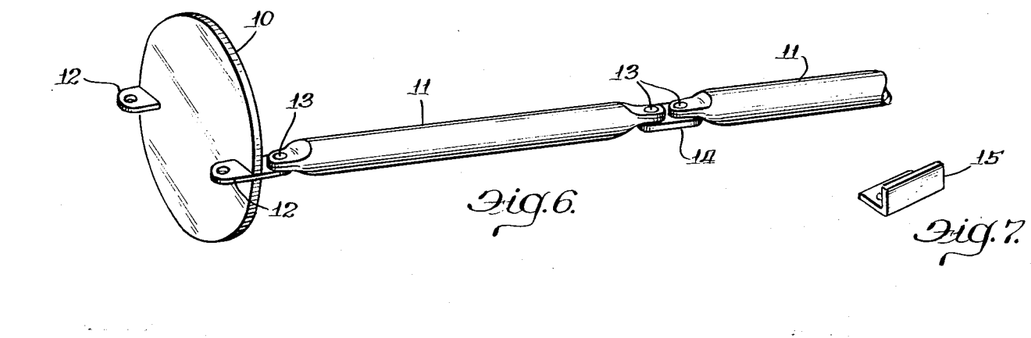
FIGURE 6 is an enlarged isometric view of a portion of the conveyor mechanism of the invention.
FIGURE 7 is an isometric view of an alternative member for a part of the conveyor system.

In detail, the conveyor of the present embodiment of the invention comprises a plurality of circular plates 10 and a plurality of strut sections 11. The circular plates 10 may be formed of a material such as steel, and the lower semicircular marginal edge thereof may be coated with a friction reducing material such as nylon or may be provided with replaceable fiber or plastic edge sections which will function as sealing and bearing means for the plates 10. Each plate 10 is provided with a pair of flanges 12. The pair of flanges 12 are spaced at the opposite end of a diameter of the plate 10 and lie substantially on the diameter. Each end of each flange 12 extends perpendicularly from the surfaces of the plate 10 and each extending portion is provided with a hole therethrough. Each strut section 11 may be formed of a material such as steel pipe with each end being flattened, shaped and provided with a hole therethrough. One end of each strut section 11 is pivotally connected to one of the extending portions of a flange 12 by means of a pin 13. It is contemplated that the holes of the flanges 12 and the strut sections 13 may be such that the pin 13 may be simply manually inserted through the appropriate holes and retained therein by a cotter pin or snap ring applied to the lower end of each pin 13. The other end of each strut section 11 is pivotally connected to a hinge member 14 by another pin 13. FIGURE 6 shows the hinge member 14 as a substantially flat plate having rounded corners. An alternative construction for each hinge member 14 is shown in FIGURE 7 as the hinge member 15. The hinge member 15 is provided with a right angle wall which lies in a plane generally parallel to the longitudinal axes of the strut sections 11 when the strut sections 11 are extended in a straight line such as shown in FIGURE 6. The upstanding wall of the hinge member 15 provides a greater bearing area on the walls of the tube arrangement than the edge of the hinge member 14. The alternative construction may be used if it is found that the hinge member 14 in engaging the inner walls of the tube arrangement produces an undesirable scoring thereof. A further alternative for member 14 may include rollers which ride on the inner walls of the tube arrangement. From the drawings it may be seen that when the conveyor is extended in the tube arrangement the strut sections 11 are prevented from folding outwardly by virtue of the side walls of the tube arrangement. The strut sections 11 may be prevented from folding inwardly by an arrangement of the axes of the pins 13 such as shown in FIGURE 8. When the strut sections 11 are positioned in an end-to-end relationship along a straight line, the pins 13 which connect the strut sections 11 to the flanges 12 of the plates 10 are disposed radially outwardly of the longitudinal axis of the strut sections 11 in a direction toward the axis of the plates 10, and the pins 13 which pivotally connect the strut sections 11 to the hinge member 14 are disposed radially outwardly of the longitudinal axis of the strut sections 11 in a direction away from or outwardly of the axis of the plates 10. This arrangement of the axes of the pins 13 provides that when any forces are applied to the plates 10 in the directions of the arrows 16 in FIGURE 8, a force will be applied to the hinge member 14 in the direction of the arrow 17. This arrangement effectively prevents the strut sections 11 from collapsing or folding inwardly, and also provides that upon the retraction of the conveyor the retracting forces applied to the plates 10 will cause an outward folding of the strut sections 11 such as shown in FIGURE 2.

The conveyor is operatively carried in a rack or frame which comprises four frame members 20. Each of the frame members 20 may be formed of a material such as angle iron and is of a length greater than the total folded or retracted length of the conveyor plus at least one and a half lengths of the length of an extended conveyor section. One end of each of the frame members 20 is secured within a ring 21 to extend parallel to the axis of the ring 21 from one side thereof. The frame members 20 are relatively positioned in the ring 21 to be disposed in two pairs which are spaced apart a distance substantially equal to the diameter of the plates 10 and with each pair of frame members 20 being vertically aligned with one flat side of each vetrically disposed pair being parallelly spaced apart a distance substantially equal to the outer diameter of the strut sections 11. This arrangement of the frame members 20 may be easily seen in the cross sectional view of FIGURE 3. The ring 21 is rotatively carried on a pair of rollers 22. The rollers 22 are rotatively carried in a horizontally spaced apart relationship in a stand which comprises horizontal members 23 and legs 24. The legs 24 may be formed of a tubular material such as steel pipe and the horizontal members 23 may be formed of angle iron and secured in a spaced apart relationship on each side of the upper end of the upstanding legs 24. A web or stop member 25 is provided between each vertical pair of frame members 20 adjacent the ring 21 to prevent stacking of the conveyor so close to the ring 21 that the folded strut sections 11 strike the stand carrying the ring 21 when the conveyor rack is rotated.

The other end of each frame member 20 is secured within a bull gear 27. The bull gear 27 is rotatively carried on one end of the hopper 28 by means of a flange 30 which is shown in cross section in FIGURE 2. The flange 30 is secured to one end wall of the hopper 28 so that the plates 10 carried by the frame members 20 are axially aligned with a hole 31 through the end wall of the hopper 28. The hole 31 has a diameter substantially equal to or slightly larger than the diameter of the plates 10

Figure 1:
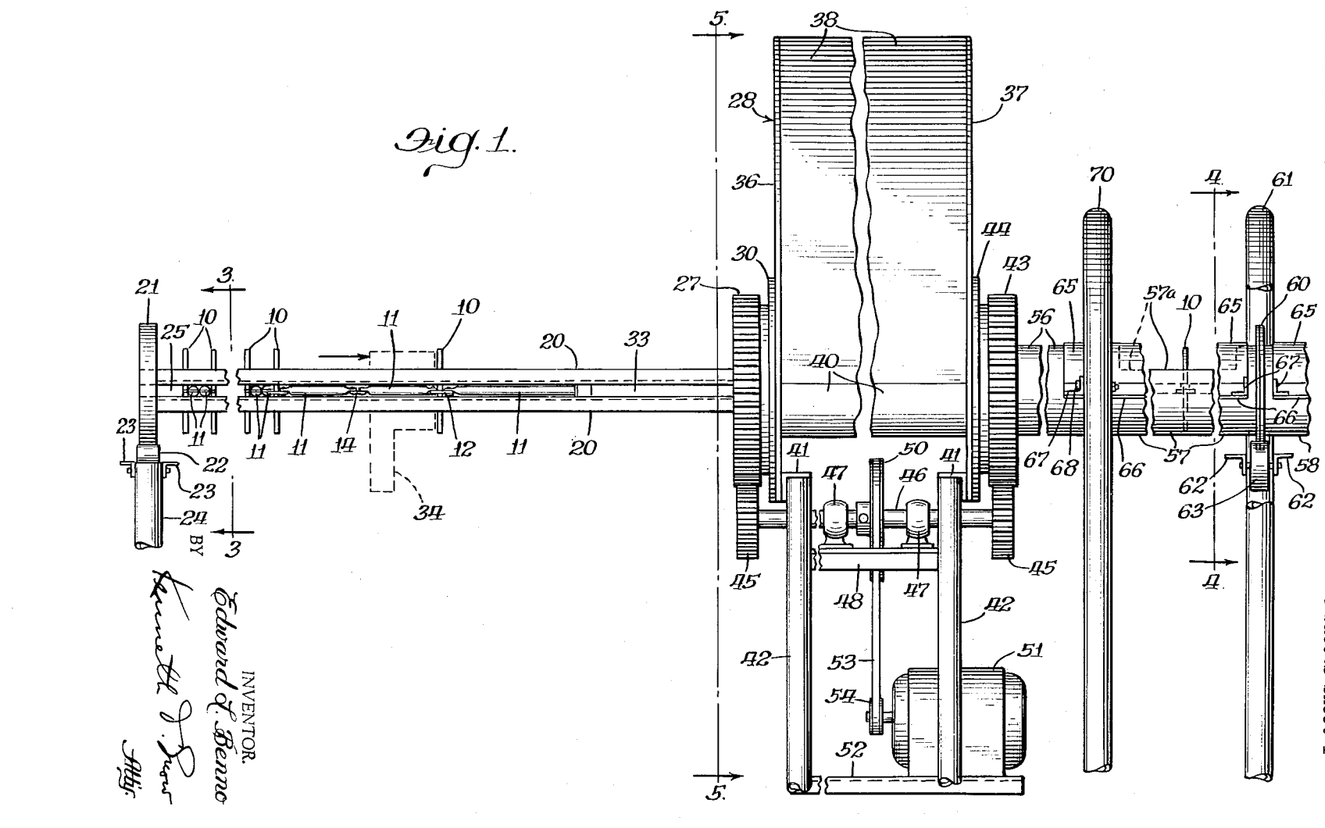
FIGURE 1 is a side elevational view of one embodiment of a livestock feeder constructed according to the invention.
Figure 2:
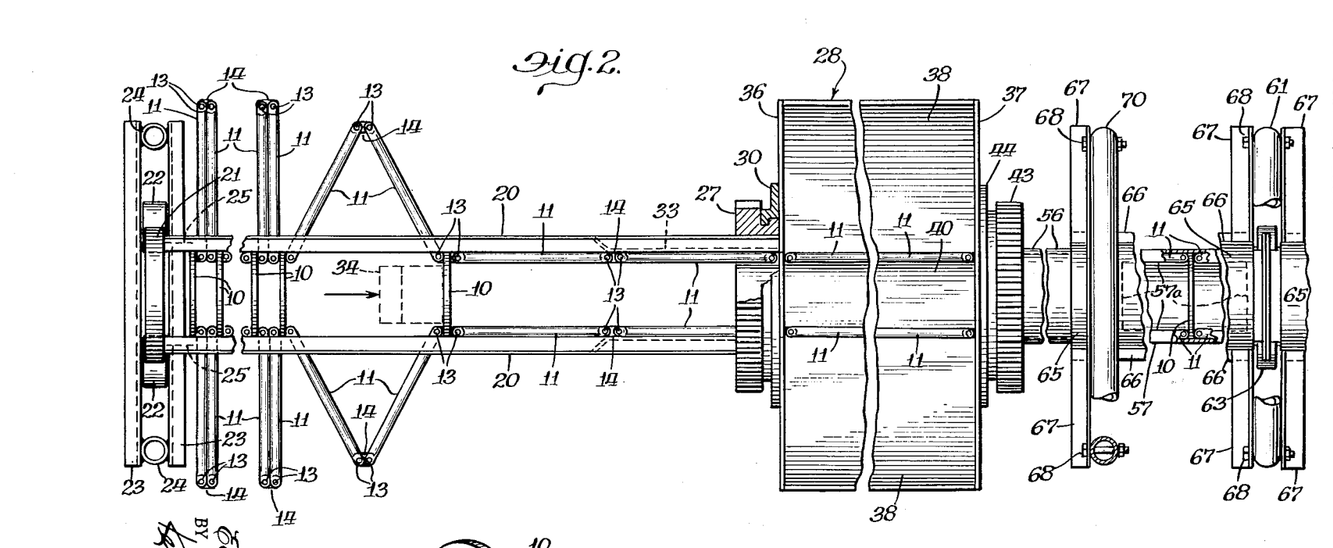
FIGURE 2 is a top plan view of the structure shown in FIGURE 1.
Figures 3, 4, 8:
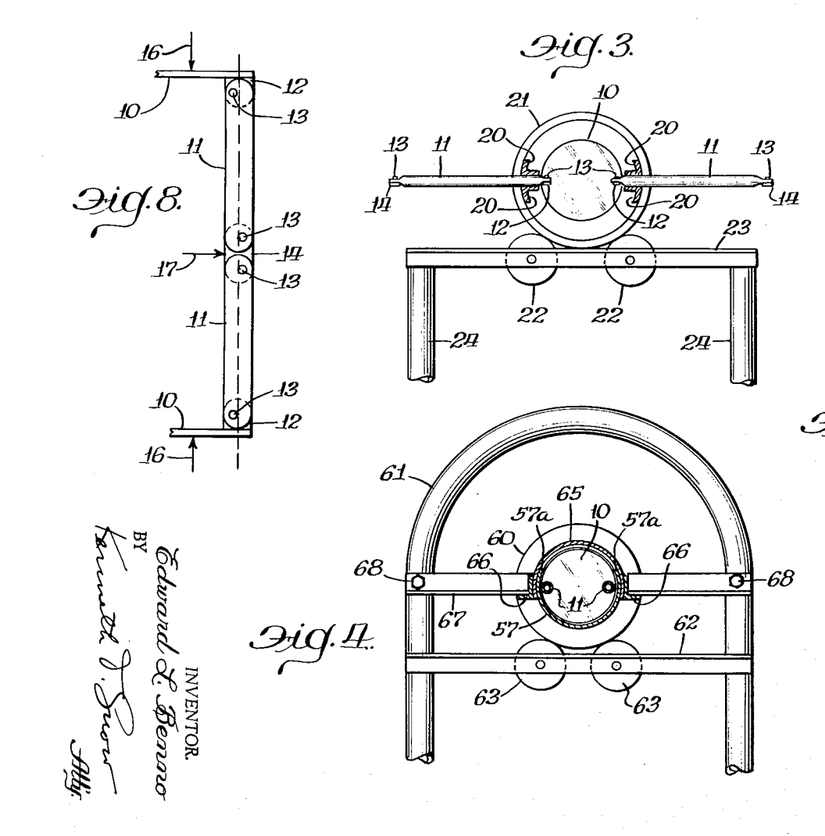
FIGURE 3 is a cross sectional view of the structure shown in FIGURE 1 and taken substantially along the line 3—3 of FIGURE 1.
FIGURE 4 is another cross sectional view and taken substantially along the line 4—4 of FIGURE 1.
FIGURE 8 is a substantially diagrammatic view of a portion of the conveyor system showing the desired relationship between various pivot axes.
Figure 5:
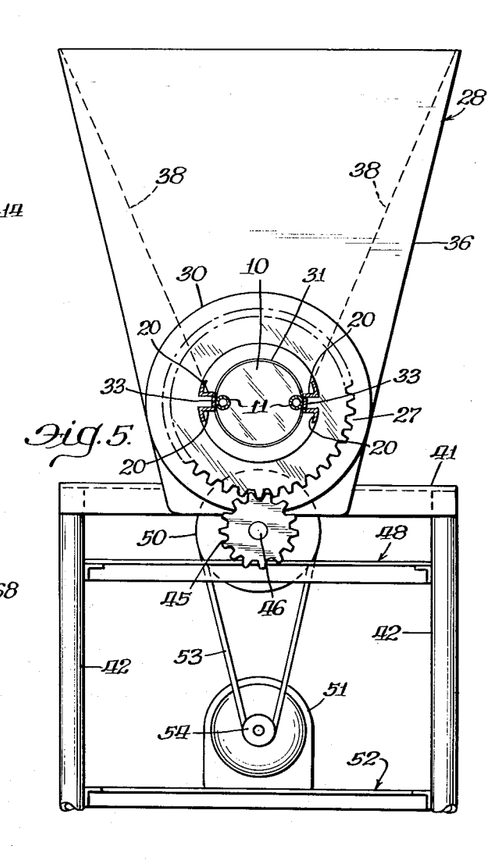
FIGURE 5 is another cross sectional view of the structure shown in FIGURE 1 and taken substantially along the line 5—5 of FIGURE 1.

The conveyor is carried in its rack so that the plates 10 are carried between the horizontally spaced apart frame members 20 with the folded strut sections 11 extending between the vertically spaced member 20 such as shown in FIGURES 1, 2 and 3. The length of conveyor rack immediately adjacent to the feed hopper 28 is of a length sufficient to carry an extended section of the conveyor. The extended section of the conveyor is retained in that position by a pair of plates 33. The plates 33 are slightly longer than one strut section 11 and are each secured between one of the vertically spaced pairs of frame members 20 as is shown in FIGURES 1, 2 and 5. Between the completely folded sections of the conveyor and the extended sections, a partially folded section is provided for as shown in FIGURE 2. The partially folded section provides that when the first extended conveyor section is moved into the feed hopper 28 a second substantially completely extended section will then be made in the area of the conveyor rack vacated by the first section. In the extension and retraction of the conveyor, it is intended that the conveyor operator always work upon the remote or rearward plate 10 of the first extended conveyor section in the conveyor rack. FIGURES 1 and 2 show an operator member 34 in dotted lines positioned to act upon the remote plate 10 of the first extended section of the conveyor to push that extended section of the conveyor into the feed hopper 28. The operator member 34 is provided with an L shape so that it may reach within the confines of the bull gear 27 to align the remote plate 10 within the opening of the wall carrying the bull gear 27. It is contemplated that the feed hopper 28 have a length so that when the remote plate 10 of an extended section is moved within the plane of the end wall of the hopper 28 carrying the bull gear 27, the near or forward plate 10 of that conveyor section will be moved to a position within the plane of the end wall of the other end of the feed hopper 28. Thus each conveyor section includes the full feed receiving length of the feed hopper 28.

The feed hopper 28 comprises end walls 36 and 37. End wall 36 carries flange 30 which in turn rotatively carries bull gear 27 and has hole 31 therethrough. The end walls 36 and 37 are interconnected in the upper portion thereof by downwardly converging side walls 38. The lower ends of the walls 38 engage the lower portion of the hopper 28 which comprises a semicylindrical section 40. The inner surface of the semicylindrical section 40 is in alignment with the lower half of the holes through the end walls 36 and 37 and is of a diameter substantially equal or slightly larger than the diameter of the plates 10. Thus, it may be seen that feed may be delivered into any conveyor section which is disposed within the hopper 28 by delivering feed into the section 40 from the upper portion of the hopper 28. Although not shown, it should be understood that the upper portion of the hopper 28 may include mixing augers, valves and other devices for properly delivering or processing feed. In FIGURE 11 a plurality of feed storage containers 35 having feed delivery conduits 39 are shown with the conduits extending into the upper end of the hopper 28. The hopper 28 is carried upon a stand which comprises a pair of angle members 41 secured to the inner lower end of walls 36 and 37. The angle members 41 are carried upon a plurality of legs 42.

The opening or hole through the end wall 37 is encircled with a bull gear 43 which is rotatively supported by a flange 44. The flange 44 is secured to the end wall 37 of the feed hopper 28 to carry the bull gear 43 concentric to the hole in end wall 37. The bull gear 43 is the main driving gear for rotating the tube arrangement of the feeder. In order that the conveyor be properly rotated with the tube arrangement, the bull gears 27 and 43 are drivingly interconnected by a pair of spur gears 45 and a jack shaft 46. Each spur gear 45 is keyed to one end of the jack shaft 46. The jack shaft 46 is rotatively carried by a pair of bearing members 47. The bearing members 47 are carried on a frame 48 which supports the bearing members 47 so that the spur gears 45 mesh with the bull gears 27 and 43. A pulley 50 is further keyed to the jack shaft 46 between the bearing members 47. An electric motor 51 is carried on a rack 52. The rack 52 is supported by the legs 42 of the stand for the hopper 28. A V-belt 53 drivingly connects a pulley 54 on the shaft of the motor 51 to the pulley 50 so that when the motor 51 is caused to operate, the bull gears 27 and 43 will be simultaneously rotated.

As noted previously any well known means may be provided for controlling the operation of the motor 51. Such means may include electric timers, a manually operated switch, or under appropriate circumstances, a computer.

The tube arrangement of the feeder comprises a plurality of tube sections. A first tube section 56 which is shown in FIGURES 1, 2 and 11 is secured at one end thereof within the bull gear 43. The first tube section 56 is primarily a transfer tube section and does not have any holes or slots therein. The tube section 56 is long enough to provide for a connection between the feed hopper 28 and the first tube section disposed to feed the livestock. The tube section 56 has an inner diameter substantially equal to or slightly larger than the diameter of the plates 10. The other end of the tube section 56 is secured to one end of a plurality of tube sections all of which are connected or secured in a continuous end-to-end relationship. These tube sections are designated 57 and 58 in the drawings, and other than in FIGURE 11, only two of those tube sections have been shown. It is contemplated that each tube section such as tube sections 57 and 58 be of a length at least equal to the length of one conveyor section, and it may generally be preferable to have the length of a tube section equal to twice the length of one conveyor section. In other words, if the hopper length is five feet so that one conveyor section is five feet in length, a convenient tube section length would be ten feet. Such an arrangement would provide that each section of tube would be spanned by two conveyor sections. This arrangement permits a tube section joint to be carried on the dividing line or fence of the pens such as shown in FIGURE 11. A stand for the tube arrangement is provided at each tube junction, and if the pens are constructed to be of widths which are some multiple of the tube lengths, a convenient and accurate arrangement and alignment of the tube sections and stands relative to the pens may be had.

The tubes such as tubes 57 and 58 are conveniently formed in the present embodiment in a circular cross section and the inner diameter of the tubes is substantially equal or slightly larger than the diameter of the plates 10. The tube ends are connected together to place the tubes in axial alignment and the connecting means is a flange assembly 60. Thus it may be seen that when the bull gear 43 is rotated to rotate tube section 56, all of the other tube sections, such as tube sections 57 and 58, will also be simultaneously rotated. All of the tube sections, such as tube sections 57 and 58, have an opening along one side thereof. That opening is shown in tube section 57 by the line designated 57a. As an alternative construction the tube sections may be constructed to be left continuous in the area or areas occupied by the intermediate plate or plates 10 when a plate 10 is disposed at each end of a tube section. The longitudinal edges of the openings in the tube sections are high enough so that the side walls thereof extend above the strut sections 11. This construction provides that as the conveyor is moved through the tube arrangement, the hinge members 14 will bear against the inner side walls of the tube arrangement.

One of the stands which supports the tube arrangement is shown in FIGURES 1, 2 and 4. One such stand is provided at each junction of tube sections. Each stand comprises a tubular frame 61 which is U-shaped with depending legs. A pair of members 62 which may be formed of a material such as angle iron are secured on opposite sides of the tubular member 61 and a pair of rollers 63 are rotatively carried between the members 62 and in a spaced apart relationship to each other. The flanges 60 at the tube junctures are carried on the rollers 63 to provide the rotational support of the tube arrangement.

Although the tube sections may be reinforced as necessary to withstand any tendency of the conveyor to bow or spread the side walls of the tube sections, the present embodiment includes a cover arrangement which not only covers the openings of the tube sections when the tube sections are disposed with the openings upwardly, but further supports and reinforces the side walls of the tube sections against spreading under the side loading of the conveyor. The cover arrangement comprises a plurality of cover sections 65. Each cover section 65 is of a length slightly less than the distance between the flanges 60, except for the first cover section 65 which may also span a portion of the closed section 56. As may be seen in FIGURE 4, the cover section 65 is curved in cross section about a portion of a circle greater than a semicircle and sufficient to span the side wall portions of the tube section 57 which are horizontally in line with the strut sections 11 of the conveyor. The longitudinal marginal edges of the cover section 65 which intersect the horizontal plane including the strut sections 11 of the conveyor are provided with bracing members 66 which may be formed of a material such as angle iron. The cover sections 65 are supported from the stands by brace members 67 which are secured at one end thereof to the ends of the brace members 66 by any means such as welding and which at the other end, are secured to the member 61 of the stands by fasteners such as those designated 68.

Dependent upon the length of the tube section 56 and the first tube section 57, the junction of those tube sections may or may not be provided with a stand. In FIGURES 1 and 2 a stand 70 which merely supports the near end of the first cover section 65 is shown.

It should be understood that a closed tube section such as tube section 56 may also be provided in other intermediate portions of the total tube arrangement. In some uses of the subject feeder it may be desirable that a closed section of the tube arrangement span an area such as between livestock pens.

In the operation of the described embodiment of the invention, it may be seen in a view such as FIGURE 2 that if the first section of the conveyor is disposed within the feed hopper 28 with the first plate 10 in line with wall 37 and with the second plate 10 at the rearward end of the first section in line with wall 36, feed may then be deposited within the lower portion 40 of the hopper 28 and within the first conveyor section. If the conveyor operator 34 is then applied against the rearward plate 10 of the second conveyor section in the direction of the arrow as shown in FIGURE 2, the first conveyor section with the feed therein will be moved into tube section 56 of the tube arrangement. The third conveyor section will then be completely extended for action thereupon by the operator. The second conveyor section which is then within the hopper 28 may be filled with the desired feed formula, which may be the same feed formula as the first section, a different feed formula, or no feed. Upon the movement of the third section of the conveyor into the hopper 28, the second section will be moved outward into tube section 56 with the first conveyor section also being advanced. The pushing of conveyor sections through the hopper 28 may be repeated as many times as desired until the feed carrying sections of the conveyor are disposed at selected or desired locations in tube arrangement. When this has been accomplished, the motor 51 may be operated to rotate the bull gears 27 and 43 to in turn rotate the conveyor rack and the tube arrangement. In the rotation of the tube arrangement the openings will be moved out from beneath the cover sections 65 and to the underside of the tube arrangement to permit the feed in the tube arrangement to drop therefrom for access thereto by the livestock to be fed. After dumping of the feed, the conveyor operator may be applied to the extended conveyor sections in the conveyor rack to retract the conveyor sections to withdraw the conveyor from the tube arrangement.

When it is desired to feed livestock along substantially the full length of the tube arrangement, and the feed which is to be supplied does not create excessive loading on the feeder, feed may be supplied almost constantly to the hopper 28, and the conveyor may be repeatedly and rapidly operated to substantially quickly load the entire length of the tube arrangement. The tube arrangement may then be turned to dump the feed therealong. If a relatively heavy feed is to be supplied to the livestock, the subject invention is capable of handling such feeds as opposed to many existing types of feeders known in the art which are practically incapable of handling heavy feeds. Assuming that substantially the entire length of the tube is to be fed with a heavy feed, it may be seen that some small number of conveyor sections may be filled with feed, those sections moved out to the most remote end of the tube arrangement and dumped from it. The leading end of the conveyor may then be returned to the hopper for refilling and again carried out to the next succeeding section of the tube arrangement. Such operations may be repeated until the heavy feed has been dumped substantially the full length of the tube arrangement.

The described operations of the feeder are by way of example to point out the unobvious versatility of the invention. Many other operating arrangements may be provided.

In further considering the operations of various parts of the invention it may be mentioned that the cover sections 65 provide that substantially the full cross sectional area of the tube arrangement may be filled with feed and moved or transported therealong with no danger of the feed blowing or falling from the open upper side of the tube arrangement. The reinforced longitudinal marginal edges of the cover sections 65 also reinforce the side walls of the tube sections in the areas thereof where the hinge members 14 or 15 of the conveyor may rub or otherwise tend to bow or distort the tube sections if the tube sections are constructed from a light gauge metal.

It may be seen from the drawings that the repair of the conveyor of the subject invention is relatively simple because of the feature of the conveyor that it is retractable into the rack. With the rack behind the feed hopper the conveyor is at a convenient general location for repair or maintenance work. If desired, the feed hopper and the conveyor rack may be housed in an appropriate building so that the feeder may easily be operated and maintained even in inclement weather. Because of the construction of the conveyor and the rack, the replacement of a plate 10 or a strut section 11 is easily accomplished. If the pins 13 thorugh the flanges 12 of any one plate are removed, that plate 10 may easily be slipped from the underside of the rack. If the pins 13 through the ends of any one or more of the struts 11 are removed those struts may easily be slipped from between the frame members 20. Maintenance of the hinge members 14 or 15 is also easily accomplished as those members are carried on the outer ends of the folded strut sections 11 and are conveniently available for repair or maintenance.

FIGURE 9 shows in a somewhat diagrammatic form a side elevational view of a pneumatically operated conveyor operator mechanism. A base or frame member 72 is provided for carrying the other parts of the operator mechanism. At one end of the base member 72 a pair of rectangular open frames 73 are secured in a spaced apart upstanding relationship. The open frames 73 carry four rail members, a pair of horizontally spaced apart lower rail members 74, and a pair of horizontally spaced apart upper rail members 75. The rail members 74 and 75 carry a vertical mounting plate 76. The vertical mounting plate 76 is provided at each vertical edge thereof with a plurality of rollers 77 which ride upon the upper and lower surfaces of the rails 74 and 75. Thus the vertical mounting plate 76 is horizontally movable on the rails 74 and 75 between the upstanding end frames 73. A pneumatic cylinder and piston assembly 78 is provided for moving the mounting plate 76. The head end of the cylinder of the assembly 78 is connected to an upstanding frame 80 by pin means 81. The piston rod of the assembly 78 is pivotally connected to a bracket 82 by pin means 83. Bracket 82 is secured to the mounting plate 76. Thus it may be seen that as the assembly 78 is extended, the mounting plate 76 is moved in one direction along the rails 74 and 75, and as the assembly 78 is retracted the mounting plate 76 is moved in the other direction along the rails 74 and 75. The mounting plate 76 carries a slide frame 84 with a slide member 85 carried therein with the slide member 85 slidable in a vertical direction. The lower end of the slide member 85 is connected to the piston rod of a second pneumatic cylinder and piston assembly 86. The cylinder portion of the assembly 86 is carried on the mounting plate 76 so that as the assembly 86 is extended, the slide member 85 is raised and as the assembly 86 is retracted the slide member 85 is lowered. The upper end of the slide member 85 carries the operator member 34. The operator member 34 includes a pivotal connection to the upper end of the slide member 85 so that the member 34 may assume either of two positions, the solid line position or the dotted line position shown in FIGURE 9. The two positions of the member 34 may be manually determined by a rotation of the member 34 when the slide member 85 is in a lowered condition. The various parts of the conveyor operator mecahnism are so sized and positioned that when the mechanism is disposed below the rack as shown in FIGURE 1 and the slide member 85 is lowered the upper side of the member 34 will be below the lower edge of the conveyor plates 10, and when the slide member 85 is positioned in its raised position the member 34 is positioned in horizontal alignment with the plate 10 such as is shown in FIGURE 1. The solid line position of the member 34 is that position which is used for extension of the conveyor. Suitable conventional air pressure means, conduits and valving may be supplied for operation of the pneumatic assemblies 78 and 86. When the member 34 engages the plate 10 such as shown in FIGURE 1, the assembly 78 is substantially retracted and the assembly 86 is substantially extended. If the assembly 78 is then extended, the extended conveyor section which is positioned immediately rearwardly of the hopper 28 will be moved into the hopper 28 with the plates 10 thereof in alignment with the planes of the walls 36 and 37 of the hopper 28, and the section of the conveyor which is in the hopper will be moved forwardly into the tube section 56. The assembly 78 may then be partially retracted, the assembly 86 may then be completely retracted, and the assembly 78 may next be completely retracted. The next operation is an extension of the assembly 86 to again position the member 34 such as shown in FIGURE 1 for a new operating cycle of the conveyor. The described operations may occur as rapidly and as long as desired, may be manually, automatically or even computer controlled.

To adjust the conveyor operator mechanism to retract the conveyor it is merely necessary to rotate the member 34 to the dotted line position shown in FIGURE 9. If the assembly 86 is then completely extended while the assembly 78 is partially retracted, the assembly 78 may then be completely retracted. In the complete retraction of the assembly 78 the rearward end of the conveyor section in the hopper 28 will be withdrawn therefrom a distance substantially equal to the distance between the plate engaging face of the member 34 in its two adjusted positions. The assembly 86 may then be completely retracted and the assembly 78 may completely extended. If the assembly 86 is then extended it will be positioned in horizontal alignment with and on the forward side of a conveyor section which is partially removed from the hopper 28. The assembly 78 may then be completely retracted to partially withdraw the next conveyor section from the hopper 28 and the cycle may be repeated until the entire conveyor is withdrawn from the tube arrangement into the rack. Because of the positioning of the axes of the pins 13 as previously described in regard to FIGURE 8, the strut sections 11 of the conveyor section will fold to positions such as shown in FIGURES 2 and 3 as the various conveyor sections are withdrawn from the tube arrangement.

Figure 10:
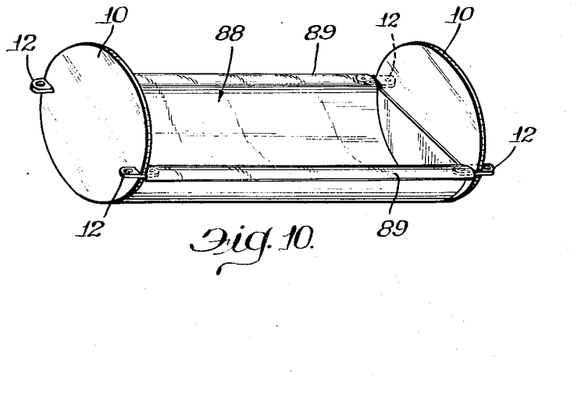
FIGURE 10 is an enlarged isometric view of a portion of the conveyor system shown with a container carried thereby.

The versatility of the invention is further increased with a container such as the open trough 88 of FIGURE 10. The trough 10 is of a length slightly less than the length of a conveyor section, and the longitudinal marginal edges of the trough 88 are curved to form flanges 89. If the trough 88 is placed in the hopper 28, the flanges 89 will encircle the upper portions of the conveyor struts disposed within the hopper 28. If a liquid such as water or a liquid feed is disposed in the trough 88, that liquid will be retained therein as the conveyor is extended through the tube arrangement. At any selected longitudinal position of the tube arrangement, the tube arrangement may be overturned to dump the liquid from the trough 88. The trough 88 will not fall from the tube arrangement during dumping because of the side wall portions of the tube sections which extend upwardly of and are slightly curved inwardly of the flanges 89. Thus it may be seen that the subject invention may not only be operated to carry separate charges of feed which are solids, but contemporaneously therewith an open container of liquid may also be carried.

Having described the invention what is considered new and desired to be protected by Letters Patent is:

1. In a livestock feeder, a feed tube, means carrying said feed tube to extend through a livestock feeding area, an extensible conveyor extendable from one end of said feed tube and through said feed tube for supplying feed through said tube by an extension of said conveyor through said tube, said conveyor being independent of any connection to said tube longitudinally thereof, means for dumping feed from said tube longitudinally thereof and means for withdrawing said conveyor from the said one end of the feed tube, whereby separate charges of feed may be moved by the conveyor through the tube from the said one end.

2. In a livestock feeder, a feed tube having a feed opening, means rotatably supporting said feed tube in a livestock feeding area whereby feed in said tube is dumped through said opening thereof responsive to rotation of said feed tube, and an extensible conveyor extendable from one end of said feed tube and through said feed tube for supplying feed through said tube by an extension of said conveyor, said conveyor being formed independently of any connection to said tube longitudinally thereof, and means for withdrawing said conveyor from the said one end of the feed tube, whereby separate charges of feed may be moved by the conveyor through the tube from the said one end.

3. In a livestock feeder as defined in claim 2, wherein said opening extends substantially longitudinally of said feed tube, and wherein said conveyor is selectively operable to supply feed which is definitely defined longitudinally of said tube to any selected longitudinal portion of said feed tube and said opening.

4. In a livestock feeder, a feed receiving hopper, a rotatable tube extending from one end of said hopper, a rotatable rack extending from the other end of said hopper, an extensible and retractable conveyor carried in said rack, said extensible and retractable conveyor being formed to carry feed from said hopper through said tube responsive to extensions of said conveyor, and means for simultaneously rotating said rack, said conveyor and said tube.

5. In a livestock feeder as defined in claim 4, wherein said conveyor comprises a plurality of plates shaped to have substantially the same shape as the cross sectional area of said tube, and strut means interconnecting said plates.

6. In a livestock feeder as defined in claim 5, said strut means being adjustable to one position to support said plates in said rack in a substantially side by side arrangement and to a second position to support said plates in a spaced apart arrangement.

7. In a livestock feeder as defined in claim 6, wherein the distance between said plates in said second position is many times the distance between said plates in said one position and is a distance substantially equal to the distance between said end walls of said hopper.

8. In a livestock feeder as defined in claim 7, wherein said rotatable tube comprises a plurality of tube sections connected in an end-to-end relationship, and wherein the length of each of said tube sections is a whole number multiple of the distance between said plates in said second position.

9. In a livestock feeder as defined in claim 6, and stationary cover means positioned over the upper side of said tube and extending downwardly in close proximity to the side walls of said tube to reinforce said side walls of said tube.

10. In a livestock feeder, a feed receiving hopper, a rotatable tube extending from one end of said hopper, said rotatable tube having a feed dump opening arrangement extending longitudinally thereof, a rotatable rack extending from the other end of said hopper, selectively operable means for simultaneously rotating said rack and said tube, conveyor means carried in said rack and selectively operable to receive individual charges of feed in said hopper and to carry said individual charges of feed through said tube separately of any other charges.

11. In a livestock feeder as defined in claim 10, wherein said conveyor means comprises a plurality of plates shaped to have substantially the same shape as the cross sectional area of said tube, each of said plates having diametrically opposed flange means extending axially outwardly from each side of said plate, and strut means interconnecting said plates to support said plates normal to the longitudinal axis of said tube and said rack, said strut means comprising a plurality of foldable struts, one end of each of said foldable struts pivotally connected to one of the flanges of one of said plates, the other end of each of said foldable struts being pivotally connected to the flange of the adjacent plate so that the foldable struts of each pair are connected in a parallel spaced apart relationship to each other between each pair of adjacent plates.

12. In a livestock feeder as defined in claim 11, wherein said rack is formed to receive and support said plates of said conveyor in a horizontally stacked arrangement with each of said foldable struts in a completely folded condition extending radially of the longitudinal axis of said rack, and wherein said tube is formed to receive said plates in a parallel spaced apart relationship to each other with said struts in a substantially straight condition and to support said struts in said straight condition against the inner opposed side walls of said tube.

13. In a livestock feeder, a feed tube, means carrying said feed tube to extend through a livestock feeding area, means for dumping feed from said tube longitudinally thereof, and means for conveying separate charges of feed through said tube to certain longitudinal positions thereof, an open liquid container, and said last mentioned means being formed to additionally carry said container through said tube to a certain selected longitudinal position thereof.

14. A conveyor for conveying feed through a tube comprising, a plurality of plates, a plurality of struts pivotally interconnected in pairs, said pairs of pivotally interconnected struts further being pivotally connected in opposed pairs between each pair of said plates to define an extensible conveyor positionable when removed from said tube in a compact arrangement with said pivotally interconnected struts folded together and extendable through said tube with said struts in substantial longitudinal alignment.

15. In a conveyor as defined in claim 14, and means for preventing said opposed pairs of struts from pivoting toward each other when said struts are in substantial longitudinal alignment and said conveyor is being pushed through said tube from one end thereof.

References Cited by the Examiner
UNITED STATES PATENTS

| 2,043,595 | 6/1936 | Raymond | 119—51.11 |
| 2,738,765 | 3/1956 | Hart | 119—52 |
| 2,914,024 | 11/1959 | Hobbs | 119—54 |
| 3,108,572 | 10/1963 | Reed | 119—52 |
| 3,133,625 | 5/1964 | Best | 119—52 X |
| 3,180,315 | 4/1965 | Moloney | 119—51.11 |

SAMUEL KOREN, *Primary Examiner.*

HUGH R. CHAMBLEE, *Examiner.*